June 10, 1958  T. A. GREEN ET AL  2,837,921

INSTRUMENT CASING

Original Filed July 28, 1950

INVENTORS
THOMAS A. GREEN,
HARVARD H. GORRIE,
AND JACK F. SHANNON
TREVOR FINK
BY Raymond W. Junkins
ATTORNEY United States Patent Office 2,837,921
Patented June 10, 1958

2,837,921

INSTRUMENT CASING

Thomas A. Green, Willoughby, Harvard H. Gorrie, Cleveland Heights, Jack F. Shannon, Euclid, and Trevor Fink, University Heights, Ohio, assignors to Bailey Meter Company, a corporation of Delaware Original application July 28, 1950, Serial No. 176,382. Divided and this application June 10, 1954, Serial No. 435,882

3 Claims. (Cl. 73—431)

Our invention relates to measuring instruments and particularly to indicating pressure gages of the vertical edgewise class.

The general shape is of a relatively thin rectangle with one end or edge of the rectangle fitted for visually observing the indication of measurement by having one or more pointers arranged to move along a vertically located scale path. Preferably the unit is mounted with the indicative scale substantially flush with a panel board, the majority of the unit projecting behind the panel.

Our unitary construction is not, however, restricted to vertical edgewise panel mounting. One widely accepted usage is for table mounting on bench or console type control panels where the scale edge of the unit is horizontal or at a slight inclination with the horizontal and with most of the unit projecting beneath the bench or console top.

Furthermore, the unitary enclosed construction allows the ganging-up or stacking of numerous units with the indicative scales parallel or end-to-end. On the other hand, the unit may be incorporated in an assembly of metering or control apparatus to advantage.

While we have chosen to designate our invention as related to pressure gages, we so-name a general class without meaning to restrict the usefulness of the invention in the measurement of other variable quantities, qualities, conditions, positions, or the like. For example, the indicator to be described may provide a visual manifestation of the magnitude of such variables as fluid rate of flow, temperature, smoke density, static pressure, speed, the position of an object; or the interrelation of measurable values or positions such as a visual comparison of fluid flow rates, pressures, or the like. Such variables, to be made visually available, may be translated into proportional pressure values to effectively actuate our device which may then provide an indication in terms of the variable. Furthermore, the indication may be of a control force or loading value and may constitute the receiver of a fluid pressure telemetering system.

One object of our invention is to provide an indicating pressure gage of unitary construction adapted for universal mounting or arrangement in multiple or with other apparatus.

Another object is to provide a miniature type of indicator for minimizing space and weight requirements in panel board assemblies.

A further object resides in providing a construction adapted to the ready ganging or grouping of a plurality of our indicators.

Another object is to provide an indicating receiver of substantially universal adaptability to different forms of variables having wide variety of ranges or values.

A further object is to provide an indicating pressure gage having improved range and zero adjustability.

Another object lies in the provision of an indicator having a minimum susceptibility to vibration, shock, or error due to tilting as experienced in pitch and roll in a ship or locomotive.

Still other objects will be apparent from a study of the drawings, the description thereof, and of our claims.

Figures 1, 2:
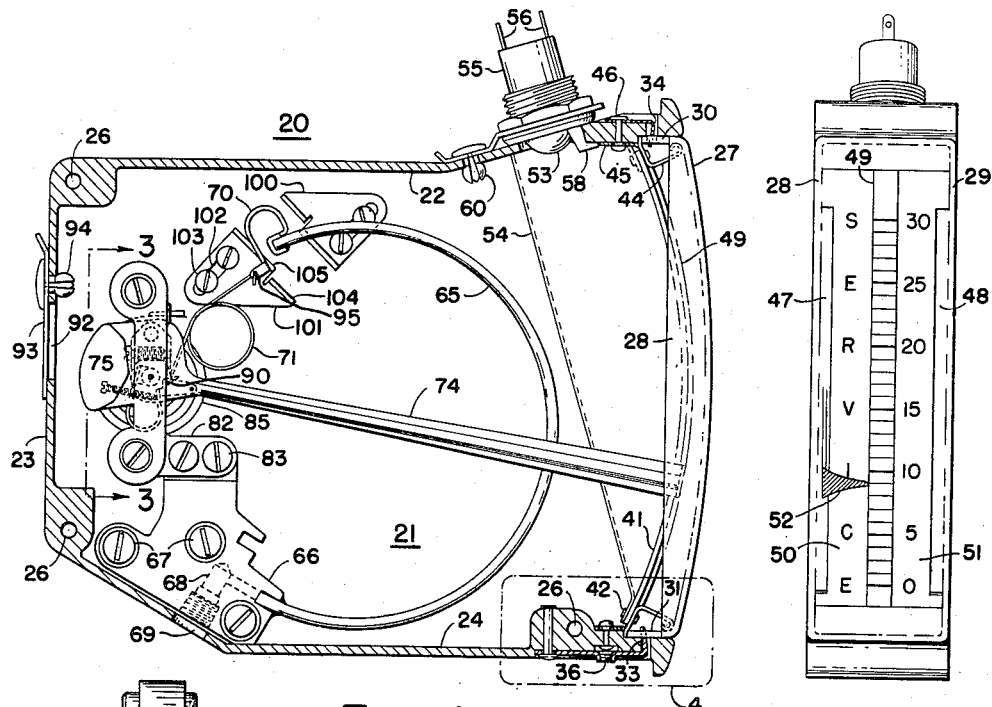
Fig. 1 is a sectional elevation of a single tube gage.
Fig. 2 is a front face view of the assembly of Fig. 1.

Referring now in particular to Fig. 1, we show therein a side elevational view of our preferred apparatus as embodied in what is sometimes termed a vertical edgewise indicator. The housing 20 is formed as a die casting obtaining lightness, with rigidity, strength and dust tightness. The shape is in general rectangular with a flat back mounting wall 21, top wall 22, bottom wall 24 and a rear wall 23. The near side is normally covered by a removable side plate 25 (Fig. 5) which may be held to the housing 20 by screws threadable into holes 26. For purposes of illustration the housing 20 of Fig. 1 has been sectioned slightly below the ledge (Fig. 5) which provides a resting place for the cover 25.

The housing 20 has no fixed front wall (to the right as viewed in Fig. 1) but the opening is desirably closed by a molded transparent window 27 which may be of glass or a clear plastic. The latter is preferred as less susceptible to breakage through handling, vibration or shock. The window 27 is formed with a long radius protrudance to the right (Fig. 1) beyond the limits of housing walls 21, 22, 24. The two sides 28 and 29 of window 27 extend rearwardly to join the forward edges of back wall 21 and of cover 25. Along the top a rearward projection 30, and along the bottom a similar projection 31, enter the confines of the housing as shown. The projection 31 is provided with a hole 32 which may be adapted to receive a spring end 33 as shown in Fig. 1 or in the dotted position of Fig. 4. In similar manner the upper projection 30 is provided with a hole receiving a more rigid spring end 34. Figs. 1 and 2 show the window 27 in its assembled location with projections 30 and 31 receiving the ends 33, 34 and thus holding the window tightly closing the end opening formed by the housing 20 and cover 25.

Figure 4:
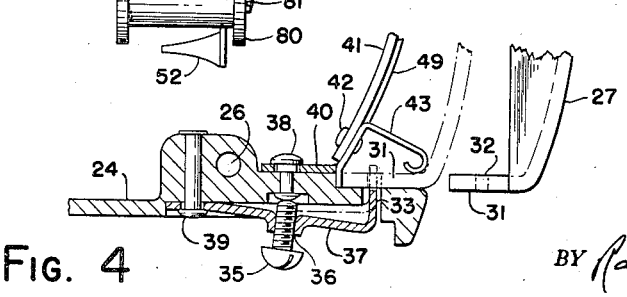
Fig. 4 is an enlarged view of that portion of Fig. 1 enclosed by dot-dash line and designated 4.

Provision is made for easy assembly as well as for ready removal of the window portion 27 for inspection and cleaning of the scale, pointer, etc. Figs. 1 and 2 show the window in its assembled position. Fig. 4 is an enlarged detail of a lower right-hand portion of Fig. 1 illustrating the operation to be performed for removing or inserting window 27.

Referring now particularly to Fig. 4 the dot-dash outline to the left shows the window structure in the same assembled location as in Fig. 1. If it is desired to remove the window structure then a lifting screw 35 may be threaded upwardly through the tapped hole 36 of the leaf spring 37 until the upper end of screw 35 engages the fixed lower end of rivet 38. Continued threading of screw 35 into hole 36 flexes the right-hand end of spring 37 (around its pivot 39) downwardly thus withdrawing the spring end 33 from the hole 32 to a position shown in solid line in Fig. 4.

Such withdrawal of the spring end 33 from the hole 32 allows an operator, through grasping the lower portion of window 27, to move the lowermost projection 31 outwardly from the wall 24 until the spring end 34 no longer engages the upper projection 30 and the window 27 is completely removed. It may be reinserted through a reverse operation of first engaging the hole in upper projection 30 with the spring end 34 and then sliding the lower portion of the window inwardly until it completely closes the end cavity of the assembly. Thereafter a backing off of the screw 35 allows spring end 33 to enter the hole 32 and lock the window in place. The screw 35 may be left partially inserted in the cavity 36 or may be removed as is shown in Fig. 1.

Referring again to Fig. 4 it will be seen that the rivet 38 serves additionally to hold the scale plate assembly by engaging a projection 40 thereof. The scale plate 41 itself is curved to an arc corresponding to the travel of the indicating pointer and may be the same or slightly different than the outward surface arc of the window 27. It is only essential to maintain sufficient clearance between the pointer, scale plate 41 and inner surface of window 27, at the mid-travel position of the pointer.

The lowermost end of the scale plate 41 receives a rivet 42 holding to it a spring slip 43 effectively spacing the scale plate 41 from the inner lower edge of the window housing. At the upper end of the scale plate 41 a similar spring clip 44 is provided as well as a projection 45 of the scale plate (similar to the projection 40). The spring end 34 as well as the projection 45 are held by a rivet 46 to the top wall 20.

The forwardly arched scale plate 41 is recessed along its edges as at 47, 48 providing clearance paths for movable pointers. Centered along the arc face of the scale plate 41 is a raised scale portion 49 upon which are engraved or painted the scale graduations. Preferably the side portions 50, 51 contain information, relative to the scale graduations, of "Service" which may be flow, pressure, or the like; and of numerals 0, 10, 20, etc. relating to the "Service" and to the scale graduations.

Preferably the pointer end 52 (Fig. 2) travels over the depressed surface 50 (or 51) with clearance thereover and with its indicating end adjacent to graduations on the elevated portion 49. As viewed in Fig. 1 it will be observed that the pointer 52 does not extend beyond the arc of the surface 49 and does not in any respect overlap the graduations or produce parallax in reading the gage.

In the present embodiment, illumination of the unit is accomplished by a recessed light bulb 53 mounted in top wall 22 behind the window 27 and scale plate 41. A light reflecting surface 54 may comprise a metallic or similar plate held in position by the rivet 42. The plate 54 may preferably be of U-shape having side walls spaced from the rear wall 21 and the inside of cover 25 to allow pointer travel. This substantially prevents light from the source 53 entering the housing surrounding shield 54 and minimizing eye viewing of working parts of the instrument behind the shield 54 through the slots 47, 48. Normally the scale plate 41 may be of some translucent plastic or similar material upon which the graduations and other indicia are painted or engraved so that they will stand out in contrast to the lighted scale plate itself when the latter is illuminated by the source 53 and reflection from the surface 54.

The light source 53 may be held in a convenient socket assembly 55 having terminals 56 and the assembly is removably mounted in a clip 57 (Fig. 5) having one or more locking prongs 58 engageable with the inner surface of a hole 59 formed in the upper wall 22 of the housing 20. The assembly is shown in Fig. 1 in its normal operation position wherein the prongs 58 are in engagement and a spring button 60 carried by the clip 57 is thus expanded through a hole 61 in the top of wall 22.

Figures 3, 5:
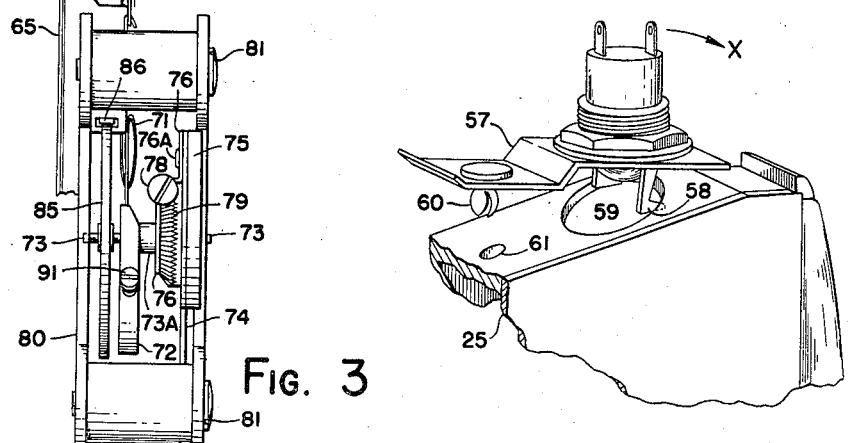
Fig. 3 is a view of a portion of the assembly of Fig. 1 taken along the line 3—3 in the direction of the arrows.
Fig. 5 is an exploded view of a portion of Fig. 1.

From the assembled position (Fig. 1) the assembly 53, 55, 56, 58, 60 cannot be loosened or pulled from the unit, in any direction except that shown by the arrow X of Fig. 5. In other words, any strain on 55 or 56, as by wires or conduit, toward the observer of Fig. 1, or away from the observer, or toward the left, will not cause a pull-out of the assembly due to the gripping of wedge prongs 58; and those are the normal directions of undesired strains upon 55, i. e., away from the back of a panel through which the window 27 projects. Desired removal is, however, readily accomplished by pivoting the assembly toward the rear of the panel in the direction of the arrow X (Fig. 5).

The operative or active element of our improved indicator is illustrated in Fig. 1 as a Bourdon tube 65 having one end permanently fastened to a base casting or forging 66 which is in turn held by screws 67 to the back 21 of the housing 20. All of the contents of the housing 20 are supported relative to the back plate 21 so that the cover 25 may readily be removed without disturbing any of the active elements which may continue in operation.

The interior of the Bourdon tube 65 communicates with a passage 68 and the lower wall 24 is provided with a clearance opening 69 to allow pipe connection to the passage 68.

The free end of the Bourdon tube 65 is connected through an element 70, connecting link 71 and U-shaped member 72 to angularly position the shaft 73. The shaft 73 is pivotally supported by a plate assembly held together by screws 81. One of the plates 80 has an extension 82 through which screws 83 pass into base 66 providing a rigid mounting for the shaft 73. Carried by the shaft 73, in addition to the U-shaped member 72, is an enlarged hub 73A and a toothed disc 79. Angular motion of the shaft 73, by the Bourdon tube 65, through the agency of elements 71 and 72, angularly moves the elements 73A and 79.

The pointer arm 74 has a weighted end portion 75 and the pointer arm assembly has a hole clearing the shaft 73. In Fig. 3 the pointer arm 74 and weight 75 are at the right of toothed disc 79 and carry a bracket 76 which spans the disc 79 to encircle the hub 73A on the left-hand side of disc 79. The bracket 76 is fastened to the pointer arm 74 by a rivet 76A.

Carried by the bracket 76, and engaging with the toothed disc 79 is a worm 78 extending in a plane parallel to pointer arm 74. Turning of the worm 78 in the teeth of disc 79 angularly moves the assembly 52, 74, 75, 76, 76A, and 78 around the disc 79 and shaft 73. This provides a zero adjustment for the pointer 52 relative to the scale graduations 49 without movement of the shaft 73 or any of the elements which cooperate to angularly position the shaft under the dictates of the Bourdon tube 65. The bracket 76, between hub 73A and rivet 76A, locks worm 78 snugly into engagement with teeth 79 thereby eliminating error due to clearances required for manufacture and operation.

Carried also by the shaft 73 is one end of a hair spring 85, the other end being adjustably clamped as at 86 to an extension of a plate 80, for taking up lost motion of the assembly.

As previously mentioned the Bourdon tube 65 angularly positions the shaft 73 through the agency of an element 70, connecting link 71 and U-shaped member 72. The member 72 is fastened at one end to the shaft 73 and at its other end carries an extension having a plurality of range holes through which we may selectively pass one end of the link 71. A screw 91 is threaded through an arm of the member 72 and has its end bearing against the other arm of the member in a hole or bearing dimple. Adjustment of the screw 91 serves to position the holes relative to the pivot 73 and to thus vary the distance relative to the length of the pointer arm. Thus the selective holes and the adjusting screw 91 provide a means for varying the range of pressure which must act upon the Bourdon tube 65 to accomplish a predetermined travel of the pointer 52 over the scale 49. Initial adjustment of screw 91 stresses the U member 72 toward an open position so that the screw is always tightly effective across the arms of the U.

Both the zero adjusting screw 78 and the range adjusting screw 91 are accessible through an opening 92 (Fig. 1) normally covered by a plate 93 held in place by the spring plug 94.

At this point we may observe that the system being described is equally applicable to the measurement and indication of either positive pressures or of negative pressures. In the latter case it may be desirable to turn the unit upside down and reverse the scale which would then be graduated from zero to whatever negative pressure were desired for total movement of the pointer 52.

After the pointer arm assembly is statically and dynamically balanced it is mounted in the unit, and, with the unit in a vertical position (Figs. 1 and 2) the pointer will remain in any given position. The hair-spring 85 is then given an initial bias such that the pointer 52 rests at its lowermost travel position (opposite zero) which is actually about one p. s. i. above zero pressure (atmospheric) within the Bourdon tube. Under this bias condition the hair-spring is fastened as at 86 and the link 71 should just fit the distance between holes 90 and 95.

The Bourdon tube elements 65, 70 are not balanced and are subject to vibration, harmonics, etc. On the other hand the pointer assembly is balanced. It is this balance, plus the loop link 71, which prevents undesired movements of the Bourdon tube end from being transmitted to, and observed at, the pointer 52. The flexing of the loop 71 allows the Bourdon tube which is unbalanced to move or vibrate without affecting the pointer which is balanced.

This application constitutes a division of our copending application Serial Number 176,382 filed July 28, 1950 and now abandoned.

What we claim as new, and desire to secure by Letters Patent of the United States, is:

1. In a measuring instrument for visually advising the value of a variable measurement, position, or the like; a relatively thin rectangularly shaped housing with the hook being made upon one end; a scale plate located within the housing facing the observed end, substantially filling the opening and bowed to a long radius, and having clearance with a side wall of the housing through which a pointer may extend; a window member closely filling the housing opening in front of the scale; projections on the ends of the window member arranged to extend into the housing; spring clip members rigidly attached by one end to the scale plate with their free ends engaging the inner edges formed by the internal surface of the window member and the projections on the ends of the window member; and leaf spring members rigidly mounted by one end external of the housing and having free spring ends extend into the housing through holes in the housing and projections in capturing the projections against the free ends of the spring clip members.

2. The combination of claim 1 wherein manually adjusted structure is attached to one of the leaf spring members for extracting its spring end from the housing and projection holes.

3. The combination of claim 2 wherein the attached structure comprises a screw member threaded through a hole intermediate the rigid pivot attachment and spring end of the leaf spring and bearing on a solid portion of the housing.

References Cited in the file of this patent
UNITED STATES PATENTS

| | | |
|---|---|---|
| 1,672,666 | Walsh | June 5, 1928 |
| 2,090,160 | Spitzglass et al. | Aug. 17, 1937 |
| 2,124,072 | Luckey et al. | July 19, 1938 |

UNITED STATES PATENT OFFICE

CERTIFICATE OF CORRECTION

June 10, 1958

Patent No. 2,837,921

Thomas A. Green et al.

It is hereby certified that error appears in the printed specification of the above numbered patent requiring correction and that the said Letters Patent should read as corrected below.

Column 3, line 15, for "slip" read -- clip --; column 6, line 1, claim 1, for "hook" read -- look --.

Signed and sealed this 28th day of October 1958.

(SEAL)

Attest:
KARL H. AXLINE
Attesting Officer

ROBERT C. WATSON
Commissioner of Patents